United States Patent [19]
Mokadam

[11] Patent Number: 4,970,866
[45] Date of Patent: Nov. 20, 1990

[54] MAGNETO CALORIC SYSTEM

[75] Inventor: Raghunath G. Mokadam, Rockford, Ill.

[73] Assignee: Sundstrand Corporation, Rockford, Ill.

[21] Appl. No.: 447,068

[22] Filed: Dec. 7, 1989

[51] Int. Cl.$^5$ .............................................. F25B 21/00
[52] U.S. Cl. ................................................ 62/3.1; 62/6
[58] Field of Search ................................. 62/3.1, 6, 467

[56] References Cited

U.S. PATENT DOCUMENTS

| | | | |
|---|---|---|---|
| 2,697,127 | 12/1954 | Bowlus | 62/3.1 X |
| 4,069,028 | 1/1978 | Brown | 62/3.1 |
| 4,332,135 | 6/1982 | Barclay | 62/3.1 |
| 4,459,811 | 7/1984 | Barclay et al. | 62/3.1 |
| 4,727,722 | 3/1988 | Kirol | 62/3.1 |

Primary Examiner—William E. Tapolcai
Attorney, Agent, or Firm—Whitham & Marhoefer

[57] ABSTRACT

In this magneto caloric heat transfer system the working material comprises paramagnetic particles suspended in a fluid which circulates continuously in a closed loop path between a region of high magnetic intensity field and a region of low magnetic field intensity.

13 Claims, 2 Drawing Sheets

MAGNETO CALORIC SYSTEM

BACKGROUND OF THE INVENTION

1. Field of the Invention

The present invention generally relates to magneto-caloric heating and cooling systems and more particularly to an improved system in which the working material is a continuously circulating paramagnetic fluid.

2. Description of the Prior Art

Magneto-caloric heating and cooling systems transfer heat to and from a paramagnetic working material through the cyclical application and removal of a magnetic field to a paramagnetic working material. The application of the field to the working material under conditions of constant entropy increases its temperature, subsequently allowing heat to be transferred from the material to a high temperature sink. Removal of the field at constant entropy decreases the temperature of the working material and allows subsequent absorption of heat from a low temperature source. Magneto-caloric systems operate around the Curie temperature of the working material and with a proper selection of working material can operate from near absolute zero to near 1400 degrees Kelvin. At temperatures above about 20 degrees Kelvin, for large differences between sink and source temperature it is advantageous to preheat the working material before magnetization and cool the material before demagnetization.

Prior art magnetic heating and cooling systems include reciprocating and rotary designs. In these prior art designs a paramagnetic member is moved in and out of a magnetic field and a fluid flowing through or past the member is used to transfer heat. Examples of such prior art systems are disclosed in U.S. Pat. Nos. 4,727,722; 4,459,811; 4,332,135; and 4,069,028. In general, prior art systems employing solid paramagnetic members as the working material require elaborate seals to prevent leakage of the heat transfer fluid. They are also somewhat inefficient owing to the need for a fluid to serve as a heat transport between the paramagnetic member and the ultimate heat sink and heat source.

SUMMARY OF THE INVENTION

It is therefore an object of this invention to provide an improved magneto-caloric heating and cooling system which eliminates the need for a reciprocating or rotary working member and which also eliminates the need for an intermediate heat transport.

Briefly, this invention contemplates the provision of a magneto-caloric system in which the working material comprises finely powdered paramagnetic particles colloidally suspended in a fluid. A pump continuously circulates the fluid through a closed conduit. In one section of the conduit a magnetic field is applied to the particles as they flow through the conduit, magnetizing them. In another section of the conduit, there is no applied magnetic field and the particles become demagnetized. Magnetized and unmagnetized sections of the conduit are thermally coupled together in order to transfer heat from the magnetized to the unmagnetized sections.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE PREFERRED EMBODIMENT OF THE INVENTION

Figure 1:
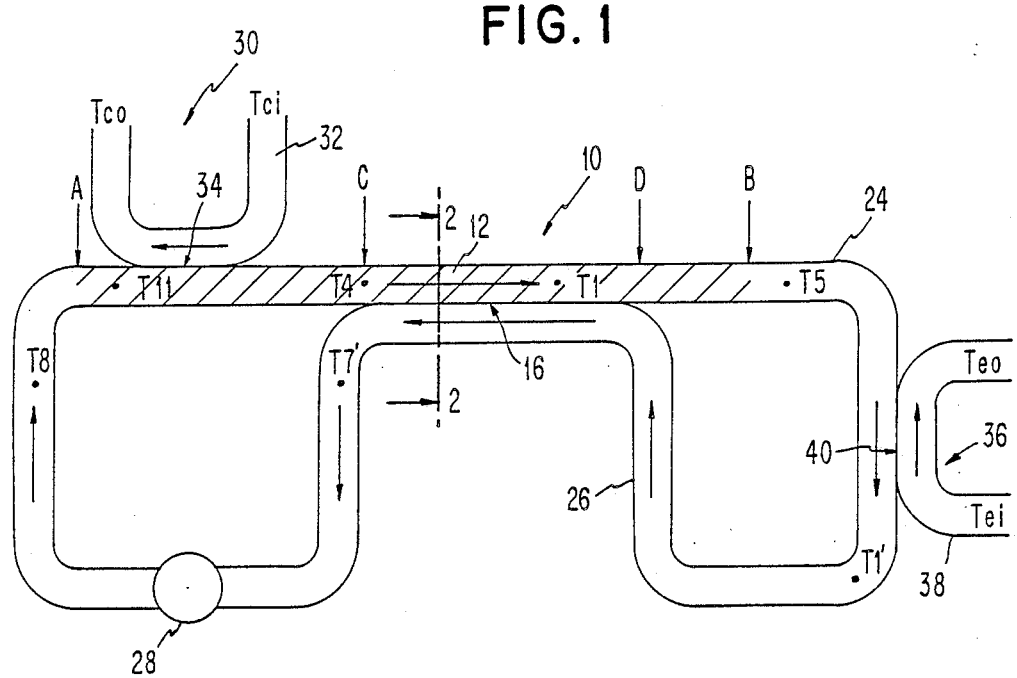
FIG. 1 is a schematic diagram of one embodiment of a magneto-caloric system in accordance with the teachings of this invention.
Figure 2:
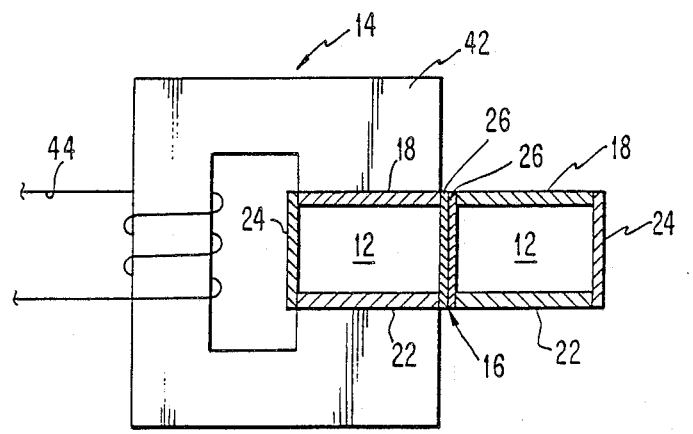
FIG. 2 is a partial sectional view along the line 2—2 of FIG. 1.

Referring now to the drawings, in which the same reference numeral indicates the same element in the various figures, FIGS. 1 and 2 show magneto-caloric cooling system in which a paramagnetic fluid working material flows continuously in a closed rectangular conduit indicated by the general reference numeral 10. It will be appreciated that the conduit may be of any suitable cross sectional shape and may change shape or size or both from zone to zone. The working material comprises a mixture of finely powdered paramagnetic particles colloidally suspended in a suitable fluid, which fluid may be a gas or a liquid. In one specific example, the working material comprises gadolinium particles suspended in kerosene, with the mass of the particles equal to about ten percent of the mass of the mixture. The size of the particles is typically on the order of one micron or less. The particles may be suitably treated to insure they remain in colloidal suspension.

A strong magnetic field is applied to the fluid working material in conduit 10 in a region 12 located between points A and B, and shown shaded in FIG. 1. The field is at right angles to the direction of flow and perpendicular to the plane of FIG. 1. As shown in FIG. 2, an electromagnet 14 may be used to generate the magnetic field in the region 12. Outside of region 12 there is no magnetic field applied to the paramagnetic fluid working material in conduit 10. In a regenerator region 16 (between points marked C and D) two sections of the conduit are thermally coupled together; a section in which the magnetic field is applied to fluid working material and a section in which there is no applied field. In this region there is a heat transfer from the fluid working material in the magnetized region to the fluid working material the unmagnetized region through the abutting conduit walls.

The conduit 10 has a top wall 18, a bottom wall 22, an outside wall 24 and an inside wall 26. The top and bottom walls in the region 12 are constructed of a suitable ferromagnetic material such a soft iron, for example. The outside and inside walls are constructed of a suitable nonmagnetic material, such as aluminum or copper. The top and bottom walls other than in the region 12 are also constructed of a nonmagnetic material, such a copper or aluminum. Heat flow occurs through the contacting inner walls of the conduit in the regenerator region 16 and the remainder of the conduit 10 is thermally isolated from the environment. It should be noted that the conduit can be constructed so that there is a reduced wall thickness (e.g. a wall of a thickness less than the thickness of a single wall) in the region 16 where thermal transfer takes place. It is also possible to extend the heat transfer surface in the region 16 by means of fins attached to the abutting walls. The fins should be nonmagnetic, thermally conductive, and oriented parallel to the flow of the fluid working material.

A suitable mechanical pump 28 circulates the fluid working material continuously; here in a counter clockwise direction, as indicated by the arrows, at a rate whereby the particles move relative to the walls of the conduit on the order of a few inches per second.

A heat exchanger indicated by the general reference numeral 30 may be used to remove heat from the fluid working material in conduit 10 as it enters the magnetized region 12. Heat exchanger 30 comprises a conduit 32 through which a suitable heat sink fluid passes. The wall of the conduit 32 is in thermal contact with the wall of the conduit 10 in the region 34 and the heat sink fluid flows continuously in conduit 32 in a direction counter to the direction of flow of the fluid working material in conduit 10. The heat sink fluid in conduit 32 enters at a temperature Tci and leaves at a elevated temperature Tco, removing heat from the fluid working material in conduit 10. A heat exchanger 36 may be used to transfer heat from a heat source to the fluid working material in the conduit 10 as it leaves the magnetized region 12. Heat exchanger 36 comprises a conduit 38 through which a suitable heat source fluid flows in a direction counter to the direction of flow in conduit 10. The conduit 38 has a region 40 thermally coupled to conduit 10. The heat source fluid enters the conduit 38 at an elevated temperature Tei and exits at a reduced temperature Teo.

Preferably the magnetic field in the region 12 is a strong field, for example a field with a flux density on the order of seven Tesla. The electromagnet 14 which extends the length of the region 12 generates the field. The electromagnet 14 has a ferromagnetic core 42 and a superconducting or low resistance coil 44 coupled to a suitable source of electrical current, not shown. In general, an increase in the magnetic flux density in region 12 results in a larger magneto-caloric effect and better cycle performance.

Figure 3:
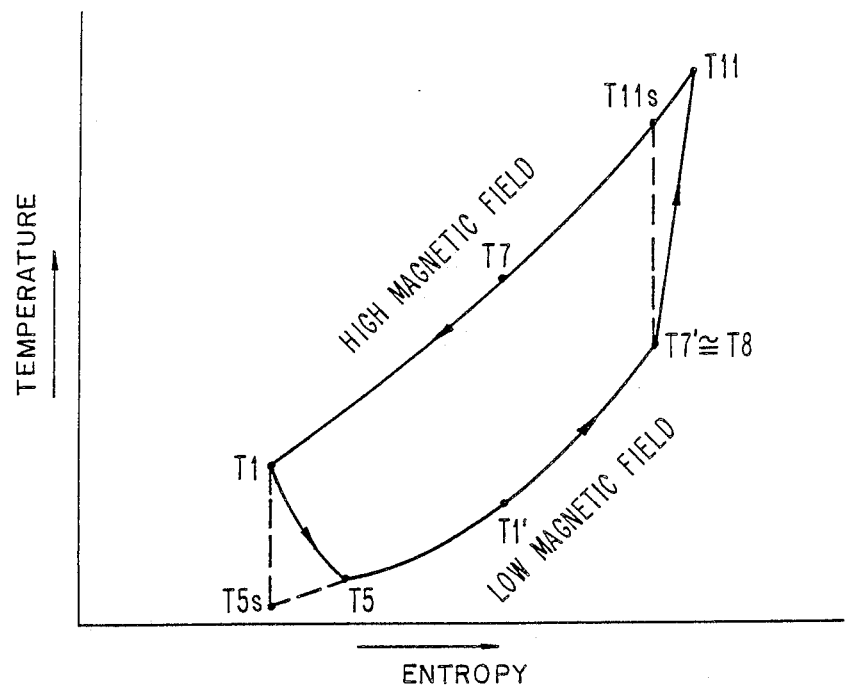
FIG. 3 is a temperature-entropy diagram illustrating the operation of the system of FIG. 1 in a Brayton cycle.

Referring now to FIG. 3 in addition to FIGS. 1 and 2, an example of the operation of the magneto-caloric system of this invention will be described in which the fluid working material comprises gadolinium particles in a kerosene fluid and in which the system executes an equivalent of a Brayton cycle. Of course the system can be adapted to execute other cycles, such as an Ericsson or Stirling cycle.

Gadolinium has a Curie temperature of 293 degrees Kelvin. The high and low temperatures of the cycle are advantageously adjusted so that the temperature of 293 degrees Kelvin is approximately midway between them. Starting at a point midway in the region 12 where the fluid working material is in a region of high flux density, its temperature is 274 degrees K. (T1). Its temperature drops to 267 degrees K. (T5) as it comes out of the magnetic field and becomes demagnetized. It flows through heat exchanger 36 and receives heat from the heat source fluid raising the temperature of the fluid working material in conduit 10 to 272 degrees K. (T1') as it leaves the heat exchanger.

The fluid working material then flows through the regenerator heat exchanger in region 16 where the magnetized and demagnetized streams in conduit are thermally coupled. The demagnetized fluid working material receives heat from the magnetized fluid and the demagnetized fluid leaves this heat exchange region at 335 degrees K. (T7'). The fluid working material flows through the pump 28 where there is a mechanical work input and exits the pump at essentially the same temperature, 335 degrees K. (T8). The fluid working material next enters the region 12 of high flux density and becomes magnetized, raising its temperature to 345 degrees K. (T11). The magnetized fluid enters heat exchanger 30 where it rejects heat to the heat sink fluid in conduit 32 and exits the heat exchanger 30 at 336 degrees K. (T7). The fluid working material is further cooled as it flows through the heat exchange region 36 to a temperature of 274 degrees K. (T1) and the cycle is complete.

The temperature rise from T7' to T11 and the temperature fall from T1 to T5 are due to the magneto-caloric effect. The rise and fall lines are not vertical (as indicated by the dotted lines in FIG. 3) because the magnetization and demagnetization processes are not 100% efficient.

Figure 4:
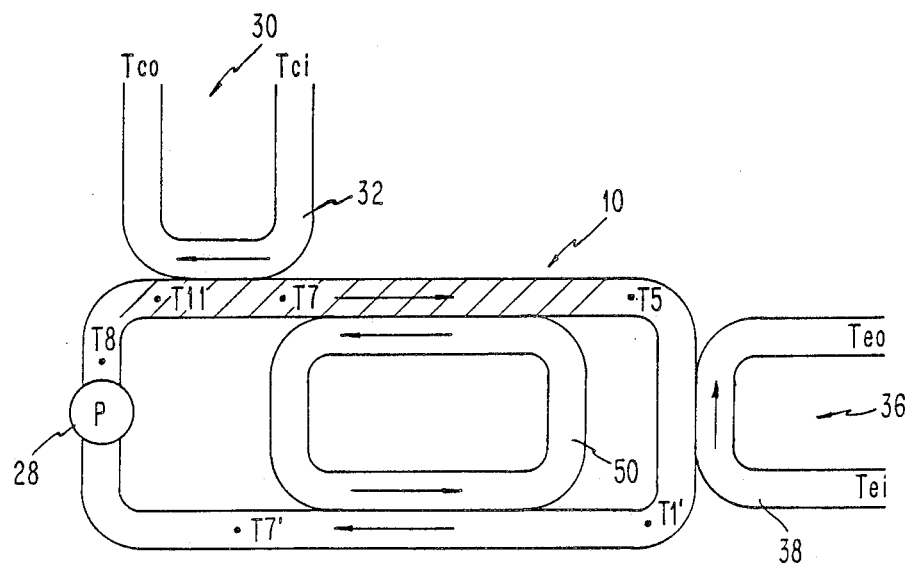
FIG. 4 is a schematic diagram, similar to FIG. 1, illustrating an alternative embodiment of the invention.

FIG. 4 shows an embodiment of the invention in which the magnetized and demagnetized regions of the fluid working material are indirectly thermally coupled to avoid any linking of the magnetic field to the demagnetized fluid working material. In this embodiment, heat is exchanged between the magnetized and demagnetized portions of the fluid working material by means of suitable thermosiphon or heat pipe 50. A fluid circulates in the heat pipe or thermosiphon 50 and receives heat from the magnetized fluid working material by boiling and rejects it to the demagnetized fluid working material by condensation. The fluid in the heat pipe may be a single fluid or a mixture of two fluids; the latter will allow for a temperature change during boiling and condensation.

It will be appreciated that there are a wide range of paramagnetic materials which may be used in the practice of this invention to cover a wide range of operating temperatures; for example from iron with a Curie temperature of 1040 degrees K. to $Gd_{2.27}S_4$ at a Curie temperature of 21 degrees. For very low temperature operation, a gas such as helium and powder of paramagnetic particles may be used. In addition, it will be appreciated that there are a wide variety of fluids which may be used in the practice of this invention, including liquids, gases and fluids which change between a liquid and gaseous phase during the cycle.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A magneto-caloric heat transfer system
comprising in combination:
a closed loop fluid conduit;
a magnetic working material in said conduit comprising particles of a paramagnetic material suspended in a fluid;
means to circulate said working material in said closed loop conduit;
a high magnetic field region in said conduit and a low magnetic field region in said conduit, said magnetic working material becoming magnetized in said high magnetic field region and becoming demagnetized in said low magnetic field region;
means to thermally couple at least a portion of said high magnetic field region and said low magnetic field region to transfer heat from said magnetized working material to said demagnetized working material.

2. A magneto-caloric heat transfer system based on the change in entropy experienced by a paramagnetic material as the material changes between a magnetized and a demagnetized state, comprising in combination:

a closed loop fluid conduit;

a magnetic working material in said conduit comprising particles of a paramagnetic material suspended in a fluid;

means to circulate said working material in said closed loop conduit;

a steady high magnetic field region in said conduit and a steady low magnetic field region becoming magnetized in said steady high magnetic field region and becoming demagnetized in said steady low magnetic field region.

3. A magneto-caloric heat transfer system as in claim 1 wherein said means to thermally couple comprises a region of said conduit wall in contact with said fluid in said high magnetic field region and said low magnetic field region.

4. A magneto-caloric heat transfer system as in claim 1 wherein said means to thermally couple comprises a thermosiphon.

5. A magneto-caloric heat transfer system as in claim 1 wherein said fluid is a liquid.

6. A magneto-caloric heat transfer system as in claim 1 wherein said fluid is a gas.

7. A magneto-caloric heat transfer system as in claim 2 wherein said fluid is a liquid.

8. A magneto-caloric heat transfer system as in claim 2 wherein said fluid is a gas.

9. A magneto-caloric heat transfer system as in claim 1 wherein said fluid changes between a gaseous and liquid phase as it circulates in said closed loop conduit.

10. A magneto-caloric heat transfer system as in claim 2 wherein said fluid changes between a gaseous and liquid phase as it circulates in said closed loop conduit.

11. A magneto-caloric heat transfer system as in claim 1 wherein said low magnetic field region in said conduit is a zero magnetic field region.

12. A magneto-caloric heat transfer system as in claim 2 wherein said low magnetic field region in said conduit is a zero magnetic field region.

13. A magneto-caloric heat transfer system as in claim 2 further including means to transfer heat from said working material in said high magnetic field region.

* * * * *